(12) United States Patent
Shimizu et al.

(10) Patent No.: US 8,867,050 B2
(45) Date of Patent: Oct. 21, 2014

(54) IMAGE PROCESSING APPARATUS, NON-TRANSITORY COMPUTER READABLE MEDIUM STORING PROGRAM AND IMAGE PROCESSING METHOD FOR RESTORING A SINGLE TABLE FROM A PLURALITY OF PAGES

(75) Inventors: Junichi Shimizu, Kanagawa (JP); Toshiyuki Yamada, Kanagawa (JP); Kiyotaka Tsuchibuchi, Kanagawa (JP); Hiroshi Niina, Kanagawa (JP); Tetsuya Wakiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 326 days.

(21) Appl. No.: 13/347,285

(22) Filed: Jan. 10, 2012

(65) Prior Publication Data
US 2013/0016381 A1 Jan. 17, 2013

(30) Foreign Application Priority Data
Jul. 12, 2011 (JP) ................................. 2011-153710

(51) Int. Cl.
G06F 3/12 (2006.01)
H04N 1/387 (2006.01)
G06K 9/00 (2006.01)

(52) U.S. Cl.
CPC .......... *G06K 9/00449* (2013.01); *H04N 1/3873* (2013.01)
USPC ............ 358/1.13; 358/1.15; 358/1.9; 358/1.1

(58) Field of Classification Search
USPC ......................... 358/1.15, 1.1, 1.19
See application file for complete search history.

(56) References Cited

U.S. PATENT DOCUMENTS 6,163,623 A * 12/2000 Ohta ............................ 382/176

FOREIGN PATENT DOCUMENTS

| | | |
|---|---|---|
| JP | 4-23185 A | 1/1992 |
| JP | 5-342408 A | 12/1993 |
| JP | 8-44827 A | 2/1996 |
| JP | 9-128480 A | 5/1997 |
| JP | 2002-73598 A | 3/2002 |
| JP | 2005-128925 A | 5/2005 |

* cited by examiner

*Primary Examiner* — Benny Q Tieu
*Assistant Examiner* — Martin Mushambo
(74) *Attorney, Agent, or Firm* — Sughrue Mion, PLLC

(57) ABSTRACT

An image processing apparatus includes an extracting unit that extracts each tablespace image from each page of image data containing plural pages read by a document reading device, a generating unit that generates each table structure data of the tables from each tablespace image extracted by the extracting unit, a discrimination unit that discriminates a connection possibility between the tables based on table structure data of the tables of each page generated by the generating unit, a determination unit that determines a connection sequence for restoring an original table by connecting each of the tables based on the connection possibility between the tables discriminated by the discrimination unit, and a restoring unit that restores data on a single table before division by connecting each of the tables based on the connection sequence determined by the determination unit.

21 Claims, 14 Drawing Sheets

ENTIRE PAGE NUMBER P = 12
PRINT SEQUENCE: FROM TOP TO BOTTOM

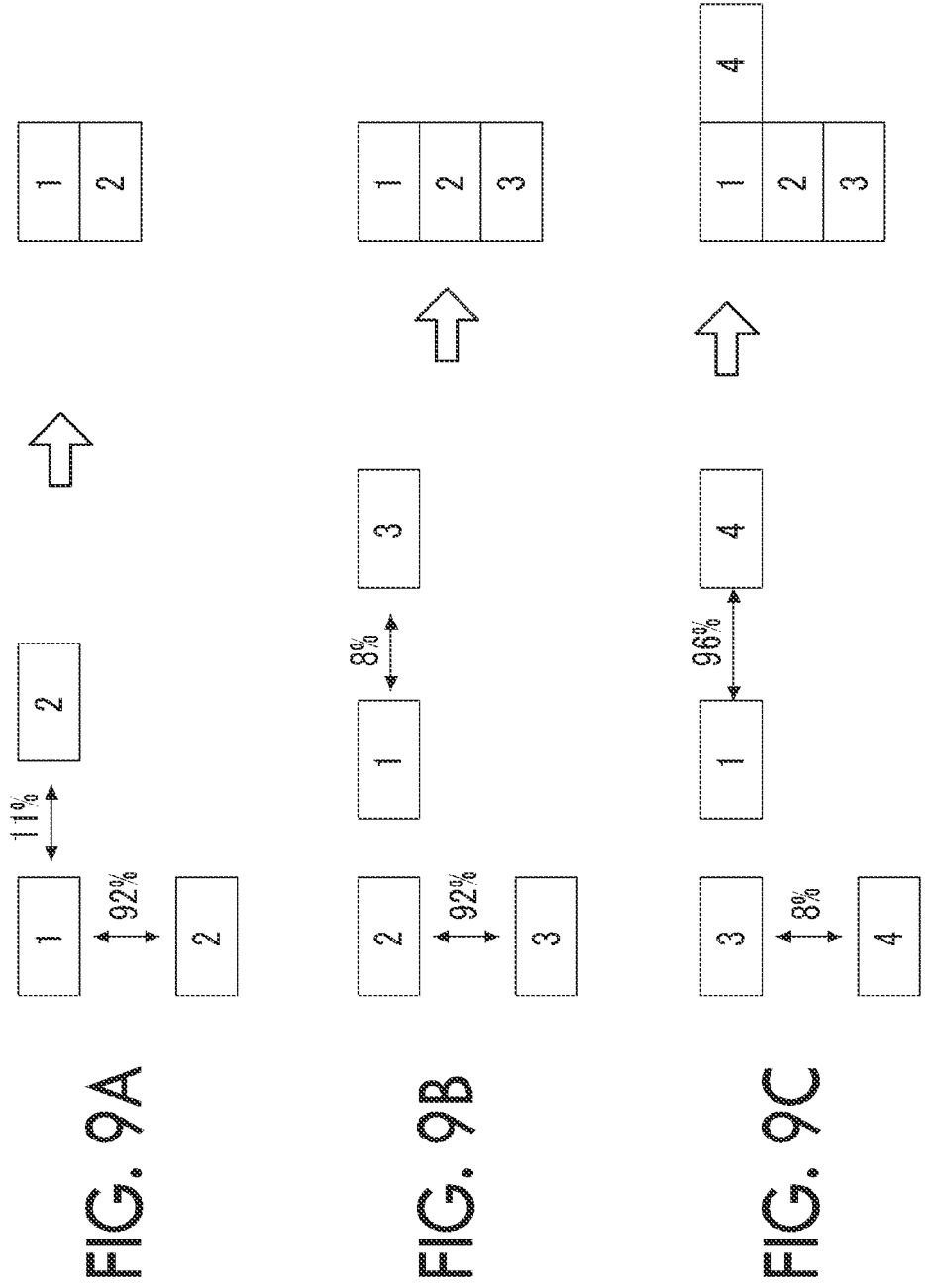

FIG. 10

DON'T YOU HAVE A PROBLEM CONNECTING TO THE FOLLOWING TABLE IN ORDER?

| YES | NO |
| --- | --- |

| 1 | 4 | 7 | 10 |
| --- | --- | --- | --- |
| 2 | 5 | 8 | 11 |
| 3 | 6 | 9 | 12 |

IMAGE PROCESSING APPARATUS, NON-TRANSITORY COMPUTER READABLE MEDIUM STORING PROGRAM AND IMAGE PROCESSING METHOD FOR RESTORING A SINGLE TABLE FROM A PLURALITY OF PAGES

CROSS-REFERENCE TO RELATED APPLICATIONS

This application is based on and claims priority under 35 USC 119 from Japanese Patent Application No. 2011-153710, filed Jul. 12, 2011.

BACKGROUND

Technical Field

The invention relates to an image processing apparatus, a non-transitory computer readable medium storing an image processing program and an image processing method.

SUMMARY

Image Processing Apparatus

According to an aspect of the invention, there is provided an image processing apparatus including: an extracting unit that extracts each tablespace image from each page of image data containing plural pages read by a document reading device; a generating unit that generates each table structure data of tables from each tablespace image extracted by the extracting unit; a discrimination unit that discriminates a connection possibility between the tables based on the table structure data of the tables of each page generated by the generating unit; a determination unit that determines a connection sequence for restoring a original table by connecting each of the tables based on the connection possibility between the tables discriminated by the discrimination unit; and a restoring unit that restores data on a single table before division by connecting each of the tables based on the connection sequence determined by the determination unit.

BRIEF DESCRIPTION OF THE DRAWINGS

Exemplary embodiments of the present invention will be described in detail based on the following figures, wherein:

FIGS. 6A to 6F are diagrams illustrating a possible table connection state in a case where a print sequence is from the left to the right, and a total number of tables is 12;

FIGS. 9A to 9C are diagrams illustrating an operation when a table data restoring unit determines the connection sequence for restoring the original table by connecting each table based on the connection possibility between each of the tables;

FIG. 10 is a diagram illustrating an exemplary case where information representing the connection position of each table in the entire table after the connection using a display unit;

DETAILED DESCRIPTION

Hereinafter, an exemplary embodiment of the present invention will be described in detail with reference to the accompanying drawings.

Figure 1:
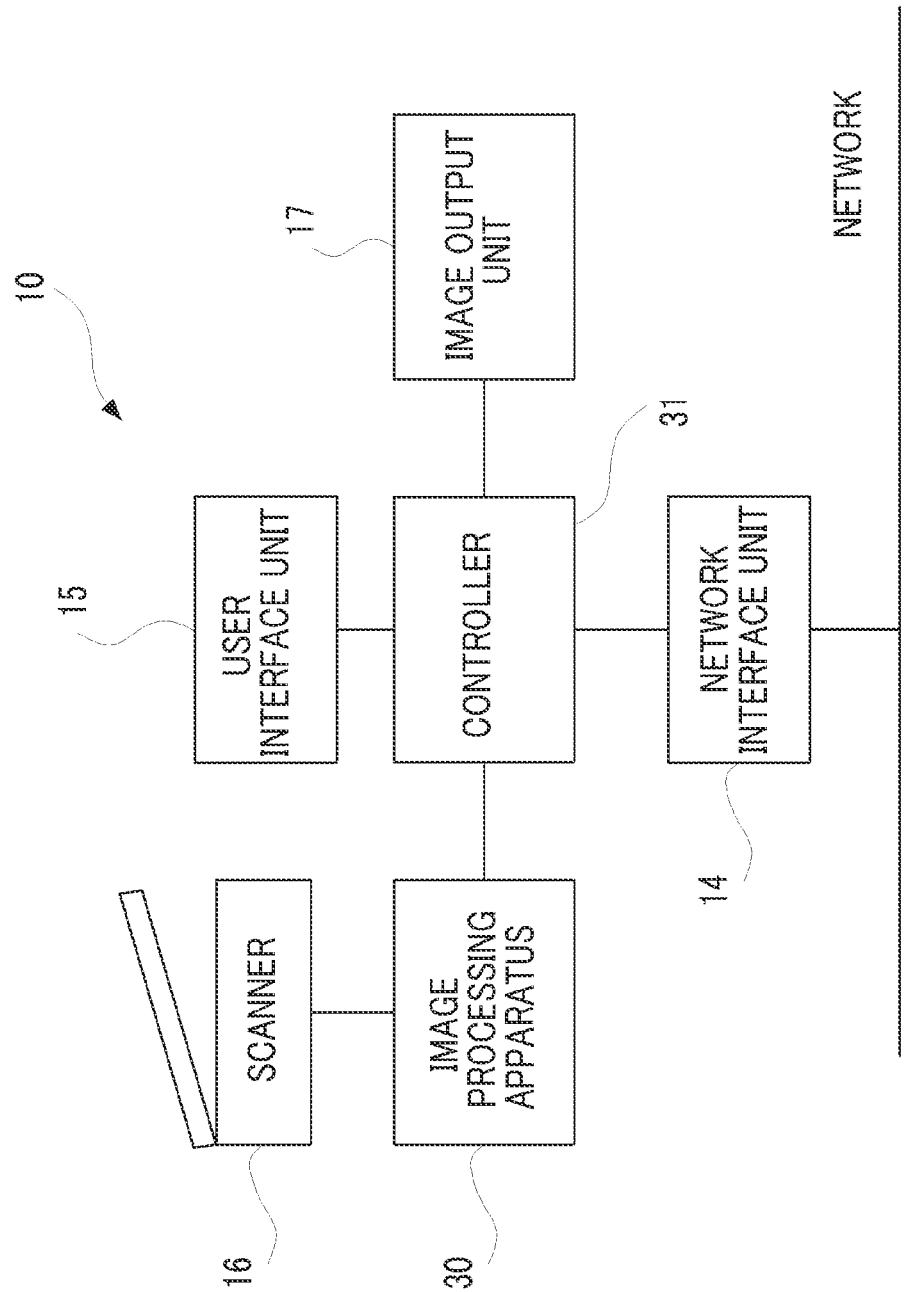
FIG. 1 is a diagram illustrating a configuration of an image forming apparatus according to an exemplary embodiment of the present invention.

FIG. 1 is a block diagram illustrating a configuration of the image forming apparatus 10 according to the exemplary embodiment of the present invention.

As shown in FIG. 1, an image forming apparatus according to the exemplary embodiment of the present invention includes a network interface unit 14, a user interface unit 15, a scanner 16, an image output unit 17, an image processing apparatus 30, and a controller 31.

The scanner 16 acquires image data by reading the document set in a tray, and the like. The scanner 16 acquires digital image data by scanning the document and performing analog-to-digital (A/D) conversion for the signal output obtained by an element such as a charge coupled device (CCD). The image data read by the scanner 16 includes the color components of each of red, green, and blue (RGB).

The image processing apparatus 30 performs various kinds of image processing for the image data read by the scanner 16. The image output unit 17 prints out the image based on image data after the image processing apparatus 30 performs the image processing under control of the controller 31.

The network interface unit 15 transmits the image data through the network or receives the image data transmitted through the network. The user interface unit 15 receives an instruction from a user and transmits the content of the instruction to the controller 31.

The controller 31 executes control for performing the print operation in the image output unit 17 based on the image data received through the network interface unit 14 or the image data from the image processing apparatus 30. In addition, the controller 31 also performs control such that image data obtained by the scanner 16 is transmitted to an intended destination via the network through the network interface unit 14 after the image processing apparatus 30 performs the image processing.

In addition, the image forming apparatus 10 is an apparatus called a multifunction machine having a number of functions such as a print function, a scan function, a copy function, and a facsimile function.

Figure 2:
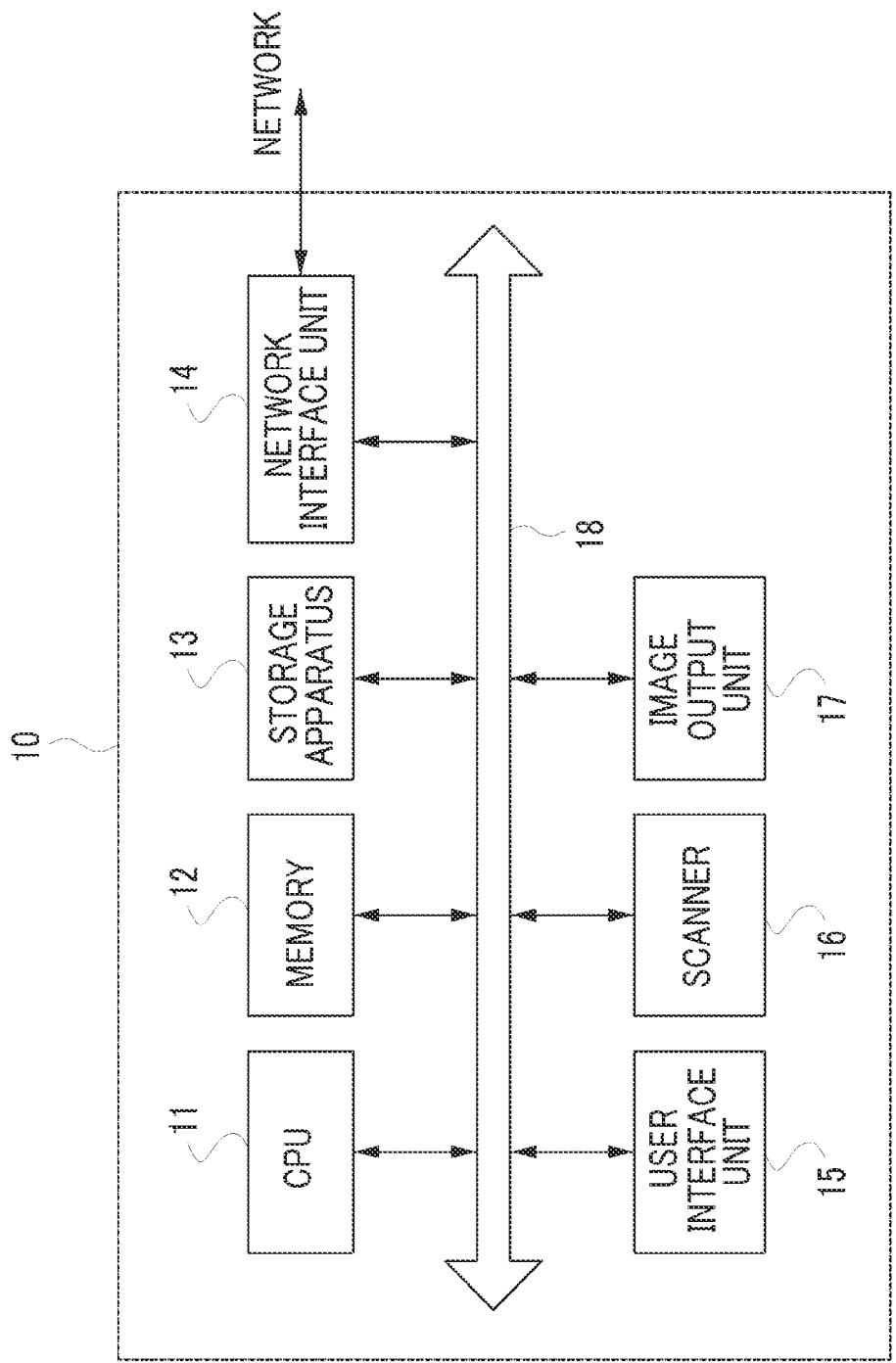
FIG. 2 is a block diagram illustrating a hardware configuration of an image forming apparatus according to an exemplary embodiment of the present invention.

Next, FIG. 2 illustrates a hardware configuration of the image forming apparatus 10 according to the exemplary embodiment of the invention.

As shown in FIG. 2, the image forming apparatus 10 includes a CPU 11, a memory 12, a storage apparatus 13 such as hard disk drive (HDD), a network interface unit 14 for transmitting or receiving the data between the external apparatus, and the like through the network, a user interface unit 15 including a touch panel or a liquid crystal display and a keyboard, a scanner 16, and an image output unit 17. Such elements are connected to each other through a control bus 18.

The CPU 11 performs a predetermined process based on a control program stored in the memory 12 or the storage apparatus 13 and controls the operation of the image forming apparatus 10. In addition, although description has been made in the present embodiment for a case where the CPU 11 reads and executes the control program stored in the memory 12 or the storage apparatus 13, the corresponding program may be stored in a storage medium such as a CD-ROM and provided to the CPU 11.

Figure 3:
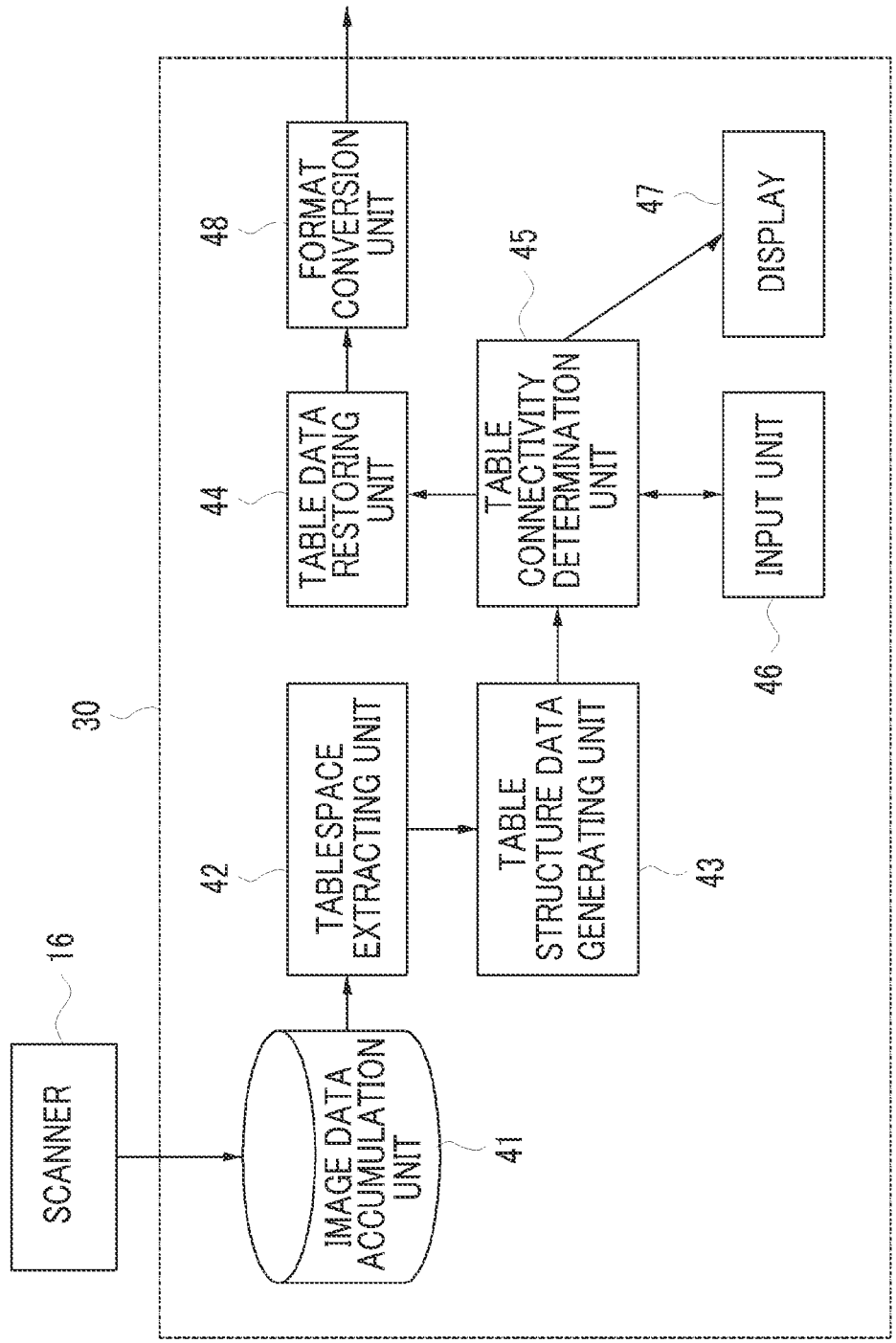
FIG. 3 is a block diagram illustrating a functional configuration of an image processing apparatus in an image forming apparatus according to an exemplary embodiment of the present invention.

FIG. 3 is a block diagram illustrating a functional configuration of the image processing apparatus 30 in the image forming apparatus 10 realized by executing the control program described above.

As shown in FIG. 3, the image processing apparatus 30 according to an exemplary embodiment of the invention includes an image data accumulation unit 41, a tablespace extracting unit 42, a table structure data generating unit 43, a table data restoring unit 44, a table connectivity discrimination unit 45, an input unit 46, a display unit 47, and a format conversion unit 48.

The image data accumulation unit 41 accumulates image data read by the scanner 16 which is the document reading device.

The tablespace extracting unit 42 extracts a tablespace image from each page of image data containing the multiple pages read by the scanner 16 and accumulated in the image data accumulation unit 41.

Figure 4B:
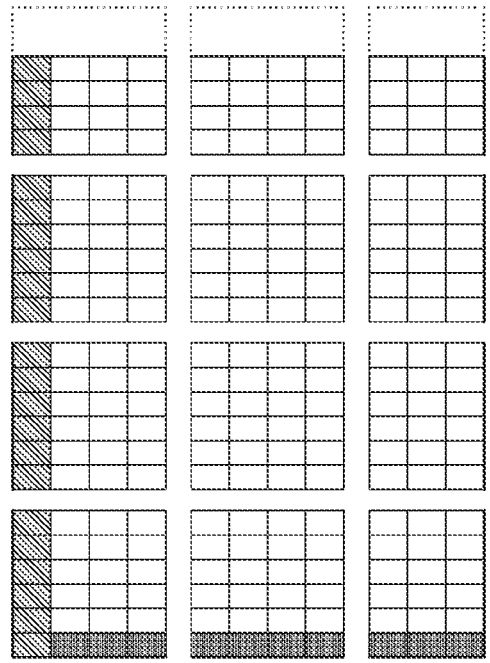
FIGS. 4A to 4C are diagrams illustrating a print state in a case where a table larger than a print paper is printed.
Figure 4C:
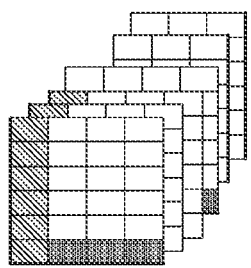
Figure 4A:
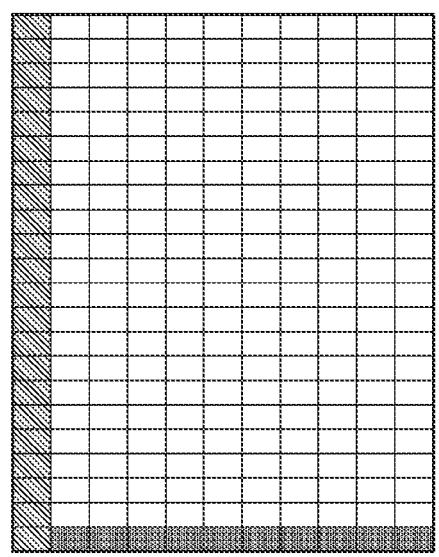

For example, if the table data shown in FIG. 4A is to be printed, and this table data is not fitted to a single print paper, this table data is divided and printed to the multiple pages as shown in FIG. 4B. In the present embodiment, the document containing the multiple pages divided and printed in this manner is read as image data by scanning the document according to a print sequence as shown in FIG. 4C. The tablespace extracting unit 42 extracts each tablespace from the image data of such multiple pages.

The tablespace extracting unit 42 uses an object separation process as a tablespace extracting process. That is, the tablespace extracting unit 42 performs the object separation process for the image data read by the scanner 16 and separates the image data for each object including a table image, a CG image, a picture image, a character image, and a line drawing.

The table structure data generating unit 43 generates each table structure data of the tables from each tablespace image extracted by the tablespace extracting unit 42. Specifically, the table structure data generating unit 43 performs the layout analysis for the table object separated by the tablespace extracting unit 42 and obtains the table structure data by performing a character recognition process (an optical character recognition (OCR) process) for the character object.

The table connectivity discrimination unit 45 discriminates the connection possibility between each of the tables based on the table structure data of the tables of each page generated by the table structure data generating unit 43. Specifically, the table connectivity discrimination unit 45 discriminates the connection possibility between each of the tables based on a combination of at least one or more pieces of information including heights or widths of each table, the number of rows and columns of the cells contained in each table, heights or widths of each cell, attributes of each cell, a thickness of the ruled line including each table, or a line type.

Figure 5A:
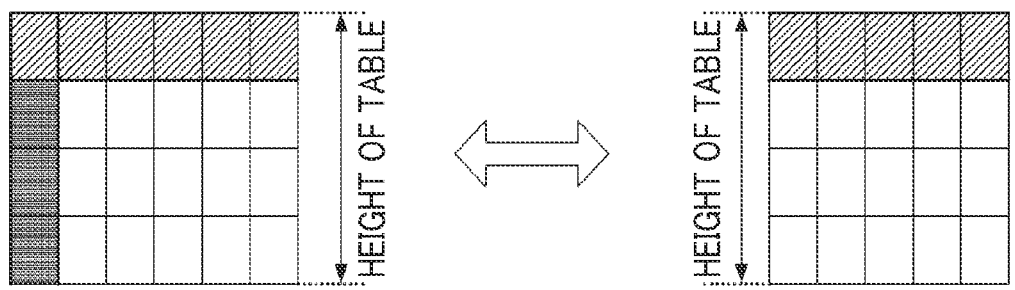
FIGS. 5A to 5D are diagrams illustrating a specific operation when a connection possibility of two tables is discriminated by a table connectivity discrimination unit.
Figure 5B:
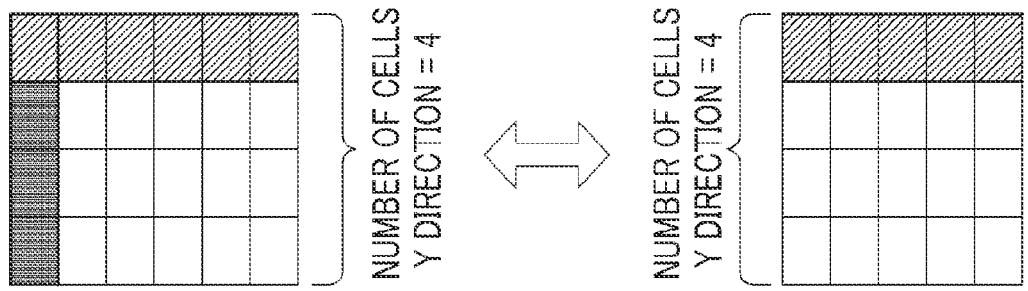
Figure 5C:
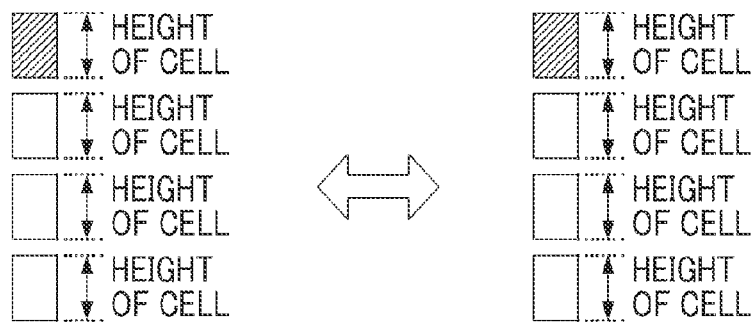
Figure 5D:
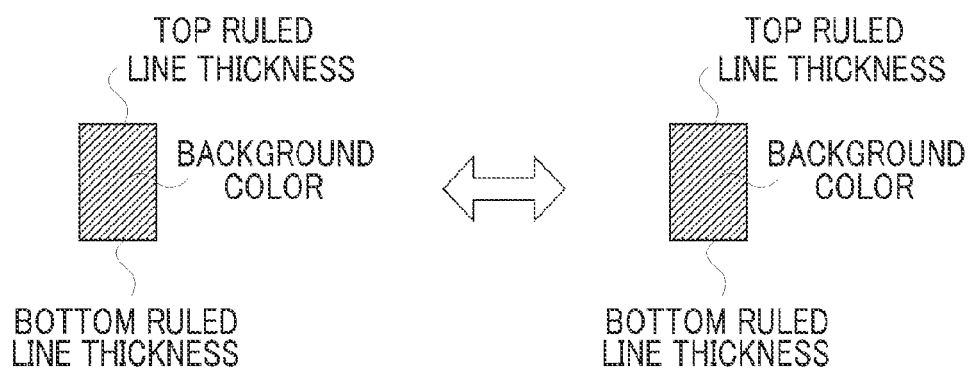
Figures 7A, 7B, 7C, 7D, 7E, 7F:
FIGS. 7A to 7F are diagrams illustrating a possible table connection state in a case where a print sequence is from the top to the bottom, and a total number of tables is 12.

FIG. 5A illustrates a case where the heights of two tables are compared to discriminate the connection possibility. In addition, FIG. 5B illustrates a case where the numbers of cells in the Y direction of two tables are compared to discriminate the connection possibility. FIG. 5C illustrates a case where the heights of each cell of two tables are compared to discriminate the connection possibility. FIG. 5D illustrates a case where the background colors, the top ruled line thicknesses, the bottom ruled line thicknesses of cells of two tables are compared to discriminate the connection possibility.

For example, the table connectivity discrimination unit 45 may set values for each comparison item as shown in FIGS. 5A to 5D in advance, add the values of matching items, and display the result in percentage (%) as the connection possibility between the compared tables.

In addition, the table connectivity discrimination unit 45 may discriminate the four-directional connection possibilities on the left, right, top and bottom by combining all tables. If it is guaranteed that pages are scanned in the print sequence, and a connection possibility between a certain table and the table read afterwards is discriminated, only a right-directional or downward connection possibility may be discriminated.

In addition, the table connectivity discrimination unit 45 may not discriminate connection possibilities for all combinations of the tables but may determine a combination of tables for discriminating the connection possibility based on the number of the tables extracted by the tablespace extracting unit 42.

For example, assuming that the number of the extracted tables is 12, and the tables are read as they are printed, it is certain that any one of the connection sequences shown in FIGS. 6A to 6F or FIGS. 7A to 7B are established.

The input unit 46 inputs the table division number X/Y representing how the original table before the division is divided in the row and column directions through the user interface unit 15 or information on the print sequence when the original table before the division is dividingly printed.

The table connectivity discrimination unit 45 may determine a combination of tables for discriminating the connection possibility based on information on the print sequence input by input unit 46.

If the print sequence when the table data are dividingly printed and the number of the extracted tables are specified, the table connectivity discrimination unit 45 may limit a combination of the tables for determining the connection possibility based on the number of tables and the print sequence.

For example, if the print sequence is from the left to the right, and a total number of the tables is 12, it is certain that there is only the connection state of any one of FIGS. 6A to 6F. If the print sequence is from the top to the bottom, and a total number of the tables is 12, it is certain that only the connection state of any one of FIGS. 7A to 7F is established.

The table connectivity discrimination unit 45 may discriminate a combination of the tables for determining the connection possibility based on information on the table division number X/Y input by the input unit 46. The table division number X/Y includes the information on the X-directional division number DIVx and information on the Y-directional division number DIVy, indicating how many parts the original table is divided into in the X direction and the Y direction, respectively.

Figure 8A:
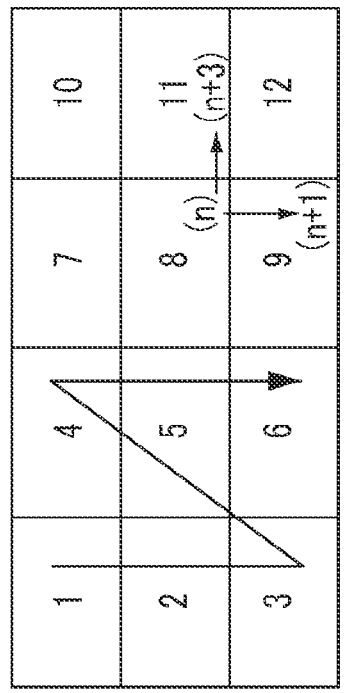
FIGS. 8A and 8B are diagrams illustrating a case where a combination of tables for determining the connection possibility is discriminated based on the table dividing number X/Y.

For example, description will be made for a case where the X-directional division number DIVx is set to 4, and the Y-directional division number DIVy is set to 3 with reference to FIG. 8. In this case, if the print direction is from the top to the bottom, the page necessary to discriminate the connectivity of the right direction in a certain nth page is n+DIVy, the page necessary to discriminate the connectivity of the bottom direction is n+1. In addition, there is a condition that both of n+DIVy and n+1 do not exceed the total page number P (here, set to 12). For example, it is recognized that the page necessary to discriminate the connectivity of the right direction in the table of the 8th page is the table of the 11th (=8+3) page, and the page necessary to discriminate the connectivity of the bottom direction is the table of the 9th (=8+1) page.

Figure 8B:
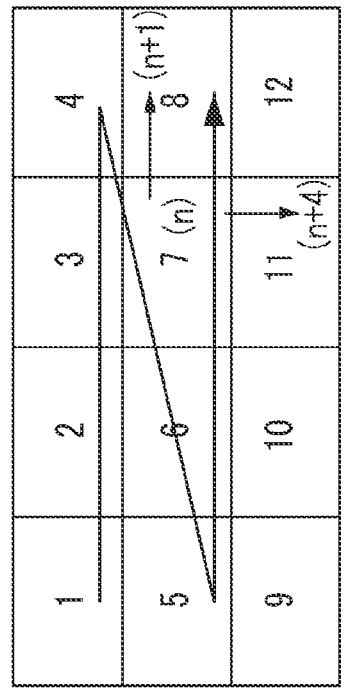

In addition, if the print direction is from the left to the lower right, as shown in FIG. 8B, the page necessary to discriminate the connectivity of the right direction in a certain nth page is n+1, and the page necessary to discriminate the connectivity of the bottom direction is n+DIVx. Here, there is a condition that both of n+1 and n+DIVx do not exceed the total page number P (here, set to 12). For example, the page necessary to discriminate the connectivity of the right direction in the table of the 7th page is the table of the 8th (=7+1) page, and the page necessary to discriminate the connectivity of the bottom direction is the table of the 11th (=7+4) page.

The table data restoring unit 44 determines the connection sequence for restoring the original table by connecting each table based on the connection possibility between each of the tables discriminated by the table connectivity discrimination unit 45. The table data restoring unit 44 restores data on a single table before the division by connecting each of the tables based on the determined connection sequence.

For example, if the connection possibilities in the horizontal direction and the vertical direction between the table extracted from the document of the first page and the table extracted from the document of the second page are 11 percentage and 92 percentage, respectively, as shown in FIG. 9A, the table data restoring unit 44 determines the connection sequence such that the second page table is connected to the bottom of the first page table.

If the connection possibility in the vertical direction of the table extracted from the second page of the document and the table extracted from the third page of the document is 92 percentage, and the connection possibility in the horizontal direction of the table extracted from the first page of the document and the table extracted from the third page of the document is 8 percentage, the table data restoring unit 44 determines the connection sequence such that the third page table is connected to the bottom of the second page table.

If the connection possibility in the vertical direction of the table extracted from the third page of the document and the table extracted from the fourth page of the document is 8 percentage, and the connection possibility in the horizontal direction of the table extracted from the first page of the document and the table extracted from the fourth page of the document is 96 percent, the table data restoring unit 44 determines the connection sequence such that the fourth page table is connected to the right side of the first page table. In this manner, the table data restoring unit 44 sequentially determines the connection sequence of the tables on each page.

The display unit 47 displays information indicating connecting positions of each table in the entire table after the connection through the user interface unit 15. For example, the display unit 47 displays that shown in FIG. 10 to a user.

If the table data restoring unit 44 may be configured such that data on a single table before the division may be restored by connecting each table when permission connection between the tables is input at the displayed connection position.

The format conversion unit 48 converts the data on the table restored by the table data restoring unit 44 into the data on the table of a general format such as Excel (registered trademark) and transmits it to a sever or a terminal specified as the destination through the network interface unit 14.

Next, the operation when the data on a single table is reproduced by reading the data on the table from the document containing the multiple pages using the image processing apparatus 30 according to an exemplary embodiment will be described in detail with reference to the accompanying drawings.

Figure 11:
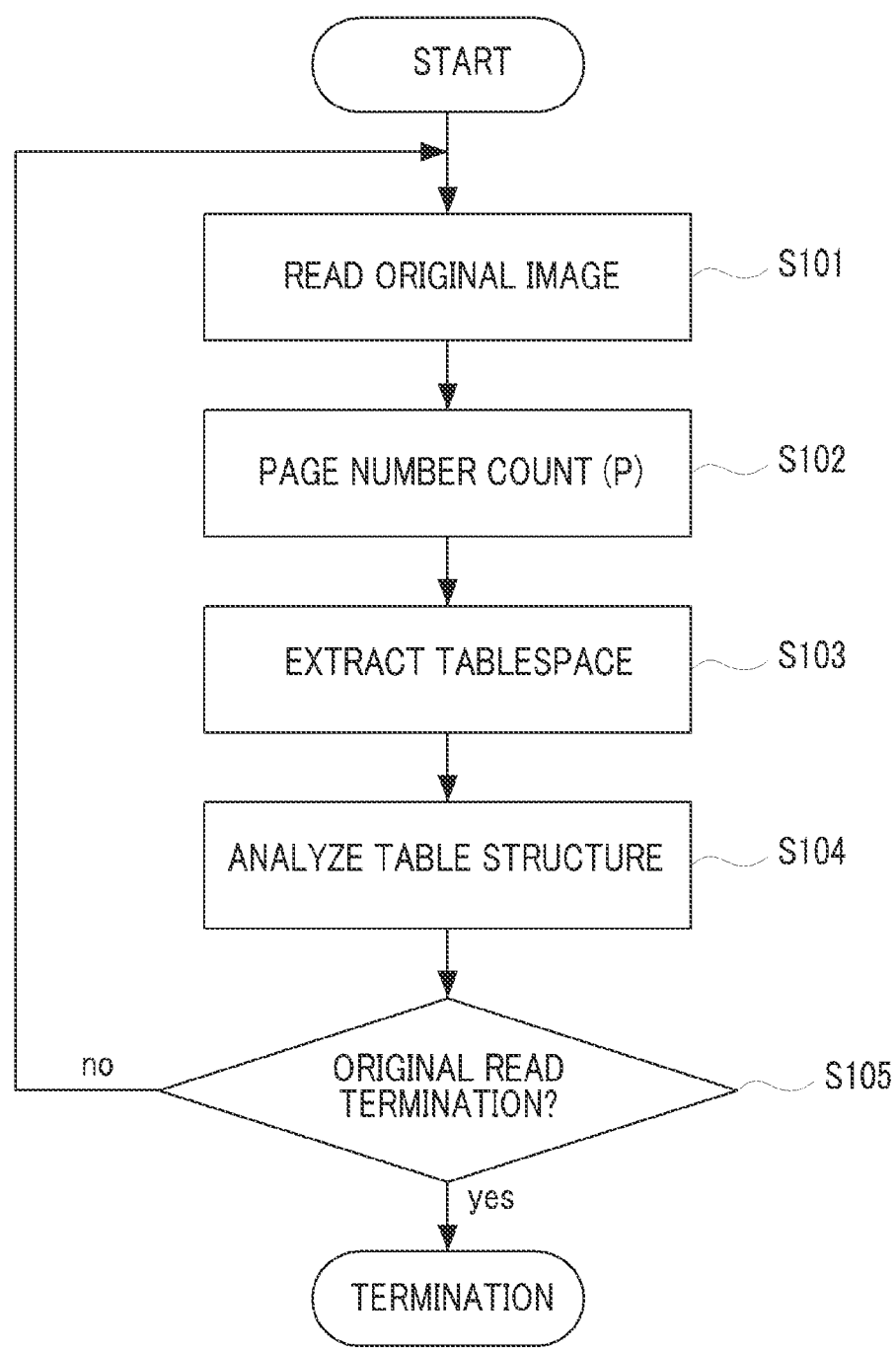
FIG. 11 is a flowchart illustrating an operation when the document having multiple pages is read by the image processing apparatus according to an exemplary embodiment of the present invention.

FIG. 11 is a flow chart illustrating the operation when a document containing the multiple pages is read by the image processing apparatus 30 according to an exemplary embodiment of the present invention.

First, the document images printed by dividing a single table into multiple pages are read by the scanner 16 and accumulated in the image data accumulation unit 41 (step S101). The number of pages P is incremented by one (step S102), the tablespace is extracted from this image data by the tablespace extracting unit 42 (step S103), and the table structure is analyzed by the table structure data generating unit 43 (step S104).

If there still remains the document to be read (YES in step S105), the process of the steps S101 to S104 is repeated so that the table images of all pages are read.

Figure 12:
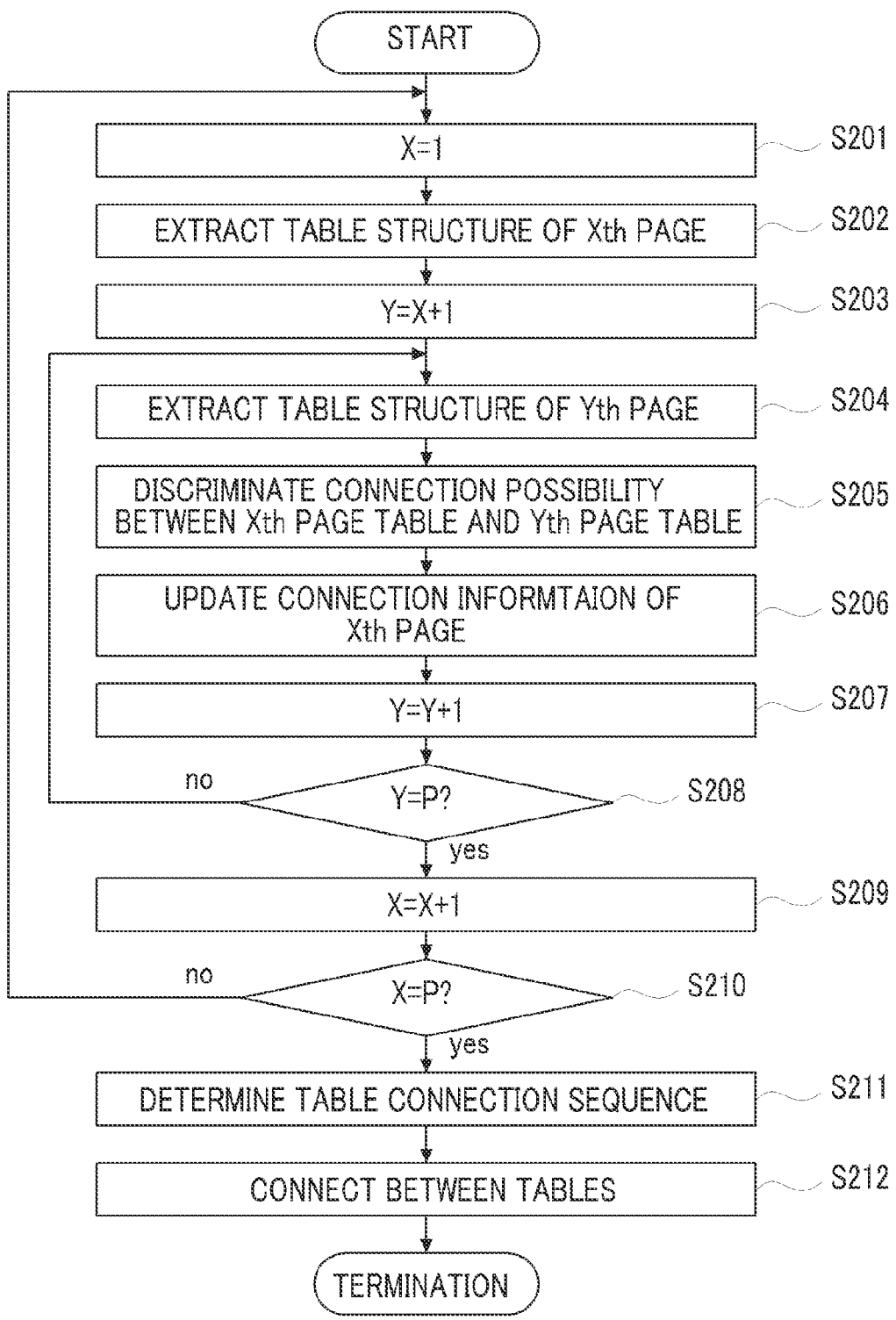
FIG. 12 is a flowchart illustrating an operation when a table of multiple pages read by the image processing apparatus is restored as a single table according to an exemplary embodiment of the present invention.

FIG. 12 is a flowchart illustrating the operation when the table of the multiple pages read by the image processing apparatus 30 is restored to the data on a single table according to an exemplary embodiment of the present invention.

If the document containing the multiple pages is read, and the table structure data are obtained from each page, first, X is set to 1 as the initial value (step S201). The table connection possibility discrimination unit 45 extracts the table structure data of X page (step S202). That is, here, the table structure data of the first page is extracted.

The value of Y indicating the page to be compared is set to X+1 (step S203). That is, here, the initial value of Y is set to 2. Then, the table connection possibility discrimination unit 45 extracts the table structure data of Y page, that is, the table structure data of the second page (step S204).

The table connection possibility discrimination unit 45 discriminates the connection possibility between Xth and Yth tables, that is, the extracted table of the first page and the extracted table of the second page (step S205). Here, the table connection possibility discrimination unit 45 may discriminates the connection possibility on the left, right, top and bottom directions between the table of the first page and the table of the second page. If the reading is made in the print sequence, the discrimination may be made only for the connection possibility of the right and bottom directions of the first page.

The table connection possibility discrimination unit 45 updates the connection information of the X page, that is, the table of the first page (step S206) and increments the value of Y by 1 (step S207). If the value of Y is not equal to the total page number P (NO in step S208), the table connection possibility discrimination unit 45 repeats the process of steps S204 to S207. That is, the connection possibilities between the table of the first page and the tables of the third to P pages are sequentially discriminated.

If the value of Y is equal to the total page number P (YES in step S208), the table connection possibility discrimination unit 45 increments X by 1 (step S209). If the value of X is not equal to the total page number P (NO in step S210), the table connection possibility discrimination unit 45 repeats the process of steps S201 to S208. That is, the table connection possibility discrimination unit 45 sequentially discriminates the connection possibilities between the table of the second page and the tables of third to P pages, the connection possibilities between the table of third page and the tables of the fourth to P pages, . . . , the connection possibility between that table of P−1 page and the table of P page.

If the value of X is equal to the total page number P (YES in step S201), and the discrimination of the connection possibilities to all pages is terminated, the table data restoring unit 44 discriminates a connection sequence for specifying how to connect each table based on the connection possibility between the tables determined by the table connection possibility discrimination unit 45 (step S211). In addition, the table data restoring unit 44 restores a single original table before the division by connecting each the tables based on the determined connection sequence (step S212).

Although the connection possibility between the tables is determined for all combinations in the process of discriminating the connection sequence as shown in the flowchart of FIG. 12, the combination of tables for discriminating the connection possibility may be limited based on the total page number, the table division number X/Y, the print sequence, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an extracting unit that respectively extracts, from image data of a plurality of pages, a plurality of tablespace images that form a single table;
   a generating unit that generates table structure data of tables from each tablespace image extracted by the extracting unit;
   a discrimination unit that discriminates a connection possibility between the tables based on the table structure data of the tables of each page generated by the generating unit;
   a determination unit that determines a connection sequence for restoring the single table by connecting each of the tables based on the connection possibility between the tables discriminated by the discrimination unit; and
   a restoring unit that restores data on the single table before division by connecting each of the tables based on the connection sequence determined by the determination unit.

2. The image processing apparatus according to claim 1, wherein the discrimination unit discriminates the connection possibility between each of the tables based on a combination of at least one or more pieces of information including heights or widths of each table, the number of rows or columns of the cells contained in each table, heights or widths of each cell, attributes of each cell, a thickness of a ruled line including each table, or a line type.

3. The image processing apparatus according to claim 2, wherein the determination unit determines a combination of tables for discriminating the connection possibility based on the number of tablespace images extracted by the extracting unit.

4. The image processing apparatus according to claim 3, further comprising:
   a display that displays information indicating connection positions of each table in the single table after connection,
   wherein the restoring unit restores data on the single table before division by connecting each of the tables when permission for connection between each table is input at a displayed connection position.

5. The image processing apparatus according to claim 2, further comprising:
   an input unit that inputs a table division number indicating how the single table before division is divided along the row and column directions,
   wherein the determination unit determines a combination of the tables for discriminating the connection possibility based on information on the table division number input by the input unit.

6. The image processing apparatus according to claim 5, further comprising:
   a display that displays information indicating connection positions of each table in the single table after connection,
   wherein the restoring unit restores data on the single table before division by connecting each of the tables when permission for connection between each table is input at a displayed connection position.

7. The image processing apparatus according to claim 2, further comprising:
   an input unit that inputs information on a print sequence when the single table before division is dividingly printed,
   wherein the determination unit determines a combination of the tables for discriminating the connection possibility based on information on the print sequence input by the input unit.

8. The image processing apparatus according to claim 7, further comprising:
   a display that displays information indicating connection positions of each table in the single table after connection,
   wherein the restoring unit restores data on the single table before division by connecting each of the tables when permission for connection between each table is input at a displayed connection position.

9. The image processing apparatus according to claim 2, further comprising:
   a display that displays information indicating connection positions of each table in the single table after connection,
   wherein the restoring unit restores data on the single table before division by connecting each of the tables when permission for connection between each table is input at a displayed connection position.

10. The image processing apparatus according to claim 1, wherein the determination unit determines a combination of tables for discriminating the connection possibility based on the number of tablespace images extracted by the extracting unit.

11. The image processing apparatus according to claim 10, further comprising:
a display that displays information indicating connection positions of each table in the single table after connection,
wherein the restoring unit restores data on the single table before division by connecting each of the tables when permission for connection between each table is input at a displayed connection position.

12. The image processing apparatus according to claim 1, further comprising:
an input unit that inputs a table division number indicating how the single table before division is divided along the row and column directions,
wherein the determination unit determines a combination of the tables for discriminating the connection possibility based on information on the table division number input by the input unit.

13. The image processing apparatus according to claim 12, further comprising:
a display that displays information indicating connection positions of each table in the single table after connection,
wherein the restoring unit restores data on the single table before division by connecting each of the tables when permission for connection between each table is input at a displayed connection position.

14. The image processing apparatus according to claim 1, further comprising:
an input unit that inputs information on a print sequence when the single table before division is dividingly printed,
wherein the determination unit determines a combination of the tables for discriminating the connection possibility based on information on the print sequence input by the input unit.

15. The image processing apparatus according to claim 14, further comprising:
a display that displays information indicating connection positions of each table in the single table after connection,
wherein the restoring unit restores data on the single table before division by connecting each of the tables when permission for connection between each table is input at a displayed connection position.

16. The image processing apparatus according to claim 1, further comprising:
a display that displays information indicating connection positions of each table in the single table after connection,
wherein the restoring unit restores data on the single table before division by connecting each of the tables when permission for connection between each table is input at a displayed connection position.

17. The image processing apparatus of claim 1, wherein the plurality of pages are obtained by dividing the single table into the plurality of tablespace images, and respectively printing the plurality of tablespace images on the plurality of pages.

18. A non-transitory computer readable medium storing a program causing a computer to execute a process for image processing, the process comprising:
respectively extracting, from image data of a plurality of pages, a plurality of tablespace images that form a single table;
generating table structure data of tables from each extracted tablespace image;
discriminating a connection possibility between the tables based on the generated table structure data on the tables of each page;
determining a connection sequence for restoring the single table by connecting each of the tables based on the discriminated connection possibility between each of the tables; and
restoring data on the single table before division by connecting each of the tables based on the determined connection sequence.

19. The non-transitory computer readable medium of claim 18, wherein the plurality of pages are obtained by dividing the single table into the plurality of tablespace images, and respectively printing the plurality of tablespace images on the plurality of pages.

20. An image processing method comprising:
respectively extracting, from image data of a plurality of pages, a plurality of tablespace images that form a single table;
generating table structure data of tables from each extracted tablespace image;
discriminating a connection possibility between the tables based on the generated table structure data on the tables of each page;
determining a connection sequence for restoring the single table by connecting each of the tables based on the discriminated connection possibility between each of the tables; and
restoring data on the single table before division by connecting each of the tables based on the determined connection sequence.

21. The image processing method of claim 20, wherein the plurality of pages are obtained by dividing the single table into the plurality of tablespace images, and respectively printing the plurality of tablespace images on the plurality of pages.

* * * * *